US007238621B2

(12) United States Patent
Krishnamoorthy et al.

(10) Patent No.: US 7,238,621 B2
(45) Date of Patent: Jul. 3, 2007

(54) INTEGRATED OPTICAL MEMS DEVICES (75) Inventors: Uma Krishnamoorthy, Albuquerque, NM (US); Daesung Lee, Stanford, CA (US); Olav Solgaard, Stanford, CA (US); Kyoungsik Yu, Seoul (KR)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/130,904

(22) Filed: May 17, 2005

(65) Prior Publication Data
US 2006/0261032 A1 Nov. 23, 2006

(51) Int. Cl.
*H01L 21/00* (2006.01)
(52) U.S. Cl. ............................ 438/745; 216/2; 216/24; 216/41; 216/83; 216/99; 438/750; 438/753
(58) Field of Classification Search ................ 216/2, 216/24, 41, 83, 99; 438/745, 750, 753
See application file for complete search history.

(56) References Cited

U.S. PATENT DOCUMENTS 4,778,583 A * 10/1988 Wagner et al. ......... 204/192.37
6,605,487 B2 * 8/2003 Franosch et al. ............. 438/50
6,770,213 B2 * 8/2004 Antaki et al. ................. 216/59
6,819,820 B1 * 11/2004 Chaparala et al. ............ 385/17
6,996,306 B2 * 2/2006 Chen et al. ................... 385/18
2002/0086455 A1 * 7/2002 Franosch et al. ............. 438/51
2006/0001941 A1 * 1/2006 Mizoguchi et al. ......... 359/224
2006/0079024 A1 * 4/2006 Akram ....................... 438/110

OTHER PUBLICATIONS

Yun, et al., "Fab of Vert. Opt. Plane using DRIE and KOH Cryst. Etch. of (110) Si Wafer", IEEE/LEOS Int. Conf. on Opt. MEMS, Aug. 2004, pp. 128-129, Takamatsu, Kagawa, Japan.
Yu, et al. "Var. BW Opt. Filts. w/Vert. Micromirrors and Si Opt. Bench Align. Tech.," IEEE/LEOS Int. Conf. on Opt. MEMS, Aug. 2004, pp. 531-532, Takamatsu, Kagawa, Japan.
Li, et al., "Tunable Opt. Wavelength Deinterleaver based on Tunable MEMS Blazed Gratings," 17th IEEE/LEOS Annual Meeting, Nov. 2004, pp. 320-321, Puerto Rico.

* cited by examiner

*Primary Examiner*—Shamim Ahmed
(74) *Attorney, Agent, or Firm*—DeMont & Breyer LLC (57) ABSTRACT A method for fabricating an optical device and micromechanical device, wherein both devices are monolithically-integrated with a substrate. The optical surfaces and micromechanical devices are each formed in an etch step that is well-suited for forming that device. In addition, the embodiments of the present invention enable the optical surface and micromechanical device to be fabricated irrespective of severe topography on the surface of the substrate.

17 Claims, 8 Drawing Sheets

INTEGRATED OPTICAL MEMS DEVICES

FIELD OF THE INVENTION

The present invention relates to semiconductor fabrication in general, and, more particularly, to MEMS fabrication.

BACKGROUND OF THE INVENTION

Miniaturized optical systems are desirable in many fields of use, including telecommunications, medicine, and space exploration. A typical miniaturized optical system comprises several passive optical devices, such as lenses, mirrors, switches, diffraction gratings, etc., and possibly even one or more active optical devices, such as lasers or light-emitting diodes. These optical devices are arranged on the surface of a small substrate in precise alignment to one another.

Miniature optical systems have been formed using fabrication techniques borrowed from MEMS (Micro-Electro-Mechanical Systems) technology. In particular, surface micromachining, deep reactive ion etching (RIE), and crystallographic-dependent wet etching have been used, individually, to fabricate integrated optical devices such as mirrors, gratings, lenses, and optical switches.

Whichever of these techniques is used to fabricate optical systems, it is important that the resulting optical surfaces (i.e., surfaces that interacts with light beams) have little or no surface roughness, have controlled surface shape, and are mechanically-stable over time and during temperature changes. Also, to offer substantial utility, the fabrication technique should be capable of producing something more than trivial arrangements of simple optical devices. And therein lie the problems.

As applied to the manufacture of miniature optical systems, surface micromachining, deep RIE, and crystallographic-dependent wet etching have certain drawbacks. These techniques, and their drawbacks, are described below.

Surface micromachining creates a three-dimensional micromechanical device for use as an optical element via successive depositions and etches of thin sacrificial and structural films on a substrate. The etches pattern or "cookie-cut" the intended shape of the device into the various films. The nature of this deposition-based approach results in devices that usually consist of a number of very thin plates (i.e., a few microns thick).

For a variety of reasons, the characteristic multi-plate structure of a surface-micromachined device exhibits mechanical instability. Of equal or greater concern for optical applications is that the surface of the plates is typically very rough, and therefore exhibits undesirable loss and scattering of optical energy.

The second fabrication technique mentioned above, deep RIE, creates features, such as holes and channels, which are very deep and narrow. In some optical systems, the sidewalls of these channels are used as mirrors or parts of other optical devices. Advantageously, the position and orientation of deep RIE features are independent of the crystal planes (described further below) in the substrate. It is possible, therefore, to form complicated arrangements of optical devices using deep RIE.

Unfortunately, the sidewalls of deep RIE features are rough due to the nature of the etching process. Like surface-micromachined optical devices, the rough sidewalls scatter optical energy in undesired directions, leading to loss of optical energy and potential cross-talk with other optical devices. Furthermore, the sidewalls are not perfectly vertical nor are they flat. As a result, an optical beam that is incident on a deep RIE sidewall will be reflected out-of-plane, relative to the inbound signal, and/or distorted, which are usually very undesirable results.

By way of background to the third fabrication technique, atoms in a crystalline solid are in a very ordered arrangement, called a "crystalline lattice." Within the lattice, the atoms align in various planes, each with a characteristic arrangement of atoms. These planes are referred to as "crystal planes."

The orientation of the top surface of silicon with respect to its crystal structure is used to define the type of silicon used and the orientation of etched features. For example, <100> silicon has a top surface that is one of its <100> crystal planes and <110> silicon has a top surface that is one of its <110> crystal planes. The numerical notation that is used to identify the crystal planes, which is referred to as a Miller Indice, is a symbolic vector representation for the orientation of the crystal or atomic plane in the crystal lattice.

The third fabrication technique mentioned above, crystallographic-dependent wet etching, produces features that are formed from specific crystal planes, as are contained in a single-crystal material.

In the case of silicon, for example, several etchants exist that etch non-<111> crystallographic directions faster than <111> crystallographic directions. This enables the formation of structures having features that are nearly perfectly aligned to <111> crystal planes and that are nearly perfectly planar as well.

Unlike deep RIE, perfectly vertical side-walls (with respect to a perfectly horizontal top surface) can be formed using a crystallographic-dependent etch (e.g., an etchant that comprises potassium hydroxide, etc.) on a <110> silicon wafer. Unfortunately, these vertical side-walls are necessarily aligned to a subset of the <111> crystal planes. As a consequence, crystallographic-dependent etching has a rather limited ability to form complex miniaturized optical systems.

It is apparent, then, that there are drawbacks to the use of existing techniques for the fabrication of miniature optical systems. For systems that contain only optical devices, surface micromachining and deep RIE are not suitable because they create poor optical surfaces. While crystallographic-dependent etches provide good optical surfaces, they offer a limited ability to create complex arrangements due to their dependence on the fixed spatial relationships of crystal planes.

The situation is even worse for more complex optical systems that include both optical devices and micromechanical devices. At least one of these devices will be compromised based on the choice of fabrication method. It would be desirable to use more than one of these fabrication methods to form complex optical arrangements, but this has historically been unworkable. In particular, once either deep RIE or crystallographic-dependent etching has been used to form one of the devices—the optical device or the MEMS device—there is great difficulty in repeating that technique or using another technique to form another device. This difficulty arises due to the severe topographical variations in the surface that result from using the first technique to form the first device. Specifically, once a surface exhibits such severe topography, it is extremely difficult to add a mask layer using conventional photolithography. Similarly, once surface micromachining has been used to form a micromechanical device on the surface of a substrate, there is great difficulty in using either deep RIE or crystallographic-dependent etching to form another device. This difficulty arises from an incompatibility of material properties and/or etch selectivity.

SUMMARY OF THE INVENTION

The present invention provides a method for fabricating miniature optical systems. In some embodiments, these systems include both an optical device and a micromechanical device, which are monolithically integrated in a substrate. The systems that can be formed via the method include known optical systems as well as some systems that could not have been made using existing techniques, as they have been practiced in the prior art.

Using a method in accordance with the illustrative embodiment enables the fabrication of a miniature optical system that incorporates:

- an optical device having an optical-quality surface, wherein the surface is orthogonal to the top surface of a substrate; and
- a micromechanical device whose position on the substrate is dictated by optical system design, as opposed to its relationship to crystal planes in the substrate.

As described in the Background section, it has been difficult to fabricate miniature optical systems possessing these characteristics using the prior art methods (i.e., surface micromachining, deep RIE, and crystallographic-dependent etches) as they have been practiced.

In the illustrative embodiment of the present invention, two of the prior art techniques—crystallographic-dependent etching and deep RIE—are used to form the devices. In particular, the crystallographic-dependent etch defines optical surfaces and deep RIE forms a micromechanical device.

In accordance with the present teachings, two enabling methods are used to address the topography problems that would otherwise prevent the use of both crystallographic-dependent etching and deep RIE to form a miniature optical system. Since the use of these enabling methods makes it feasible to use both crystallographic-dependent etching and deep RIE, the fabrication compromises of the prior art are avoided.

One of the enabling methods involves forming a single mask layer with multiple regions. Using this method, the same mask layer is used to form both the optical device and the micromechanical device, so that topography issues are managed.

The other enabling method involves using a second "mask" substrate, which is added to the top surface of the substrate after the first device is formed. The mask substrate provides a substantially planar surface that is suitable for conventional photolithography. Once again, the topography issue is handled.

It is to be understood that using the present methods, a severely-varied topography still results after the formation of the first device. But the challenges that arise from this topographical variation are no longer impediments to further processing.

The illustrative embodiment of the present invention comprises:

- etching a first surface of a substrate to expose a second surface, wherein the first surface is characterized by a non-<111>-crystallographic orientation and wherein the second surface is characterized by a <111>-crystallographic orientation; and
- etching the first surface of the substrate to expose a third surface, wherein the third surface is not characterized by a <111>-crystallographic orientation; wherein the first surface and the second surface form an angle that is within a range of about 85 degrees to about 95 degrees.

DETAILED DESCRIPTION

The following terms are defined for use in this Specification, including the appended claims:

Mechanically-coupled means that one device is linked to another device such that movement of the one device affects the other device. For example, a motor and a mirror are mechanically-coupled if actuation of the motor causes motion of the mirror. This could be through direct contact, as in the case of two physically-coupled devices (e.g., a mirror that is mounted on a linear-motor); or through an intermediate medium (e.g., a mirror that is moved via a hydraulic force that is generated by a motor).

Micromechanical device means a device or structure that has dimensions that are in the range of about 0.01 micron to a few millimeters and that is fabricated on a substrate using MEMS or nanotechnology fabrication techniques (e.g., bulk micromachining techniques, surface micromachining techniques, integrated-circuit fabrication techniques, etc.), wherein the device or structure responds to a stimulus with motion relative to the substrate. Examples of micromechanical devices include without limitation: sensors, such as accelerometers, gyroscopes, and pressure sensors; or actuators, such as comb-drive linear motors, switches, or 2-axis gimbal-mounted mirrors.

Monolithically-integrated means formed either: in the body of a substrate, typically by etching into the substrate or; on the surface of the substrate, typically by patterning layers disposed on the surface.

Operatively-coupled means that the operation of one device affects another device.

Optical device means a device that is capable of predictably or controllable affecting an optical signal, such as by absorption, reflection, diffraction, transmission, generating an optical signal, or processing an optical signal. Examples include passive optical devices, such as lenses, mirrors, switches, diffraction gratings, etc., and active optical devices, such as lasers, light-emitting diodes, etc.

Physically-coupled means in direct, physical contact (e.g., a mirror that is mounted on a linear-motor).

Reflective-surface means a surface that reflects a significant amount of optical energy at the wavelength or wavelengths suitable for an application.

Substrate means the material on or in which devices are formed. Example substrates include without limitation: bulk silicon wafers, in which a wafer comprises a homogeneous thickness of single-crystal silicon; composite wafers, such as a silicon-on-insulator wafer that comprises a layer of silicon that is disposed on a layer of silicon dioxide that is disposed on a bulk silicon handle wafer; or any other material that serves as base layer upon which, or in which, devices are formed. Examples of such other materials that are suitable, as a function of the application, for use as substrate layers and bulk substrates include, without limitation, germanium, alumina, gallium-arsenide, indium-phosphide, silica, silicon dioxide, borosilicate glass, pyrex, and sapphire.

Overview

To provide context for the detailed fabrication steps that are presented later in this specification, this Detailed Description proceeds with a "high-level" depiction of a miniature optical system and a method for its fabrication, in accordance with the illustrative embodiment of the present invention.

Figure 1:
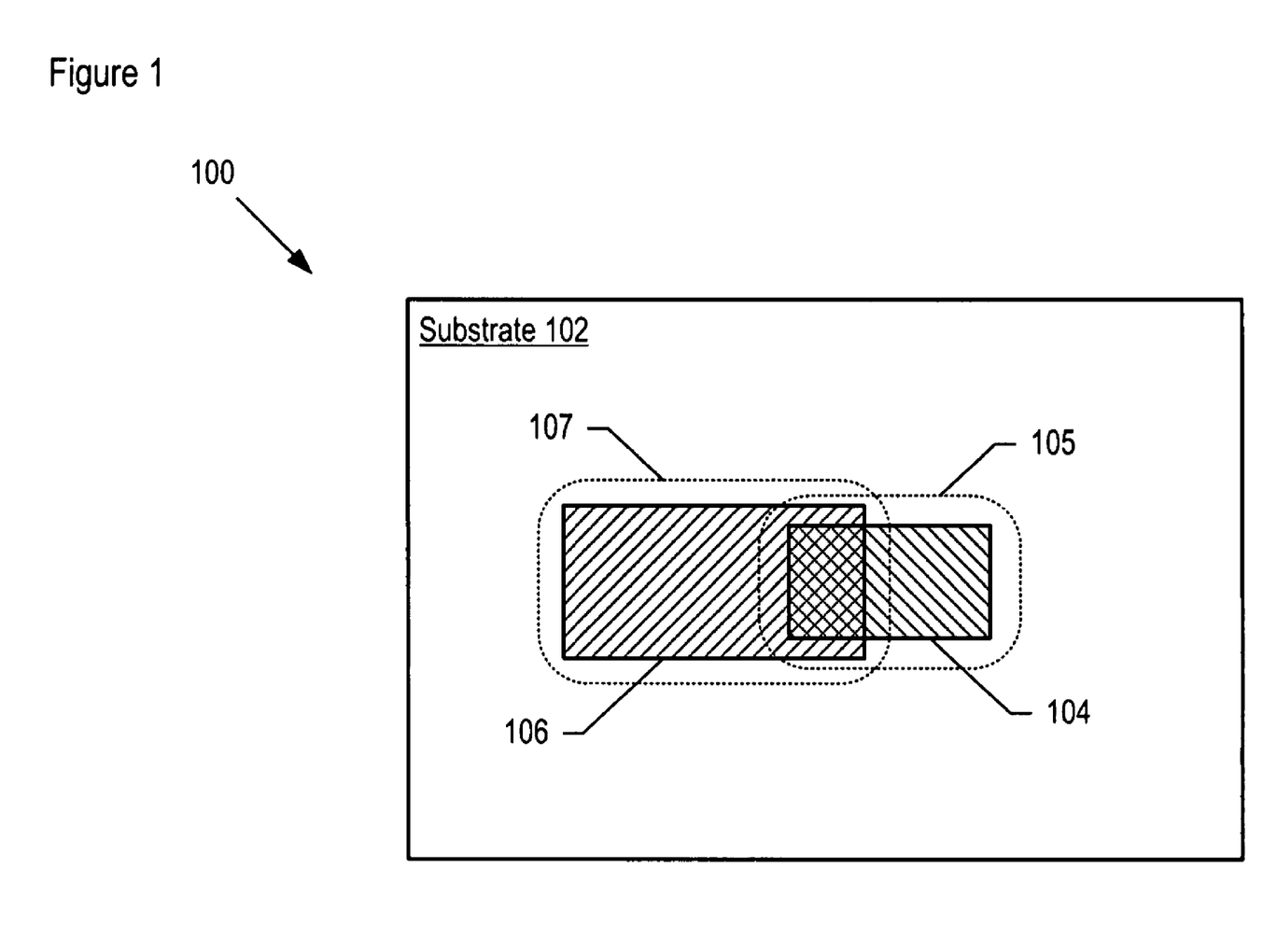
FIG. 1 depicts a block diagram of arrangement 100 in accordance with the illustrative embodiment of the present invention.

FIG. 1 depicts a block diagram of miniature optical system 100 in accordance with the illustrative embodiment of the present invention. System 100 includes optical device 104 and micromechanical device 106, which are operatively coupled to one another. Optical device 104 is monolithically integrated with substrate 102 in first area 105. Micromechanical device 106 is monolithically integrated with substrate 102 in second area 107.

For the purposes of this specification, the terms "first area," "second area," "first region," and "second region," refer to the volume occupied by a structure that is formed:
  i. on the surface of the substrate; or
  ii. in the body of the substrate; or
  iii. a combination of i and ii.

Figure 2:
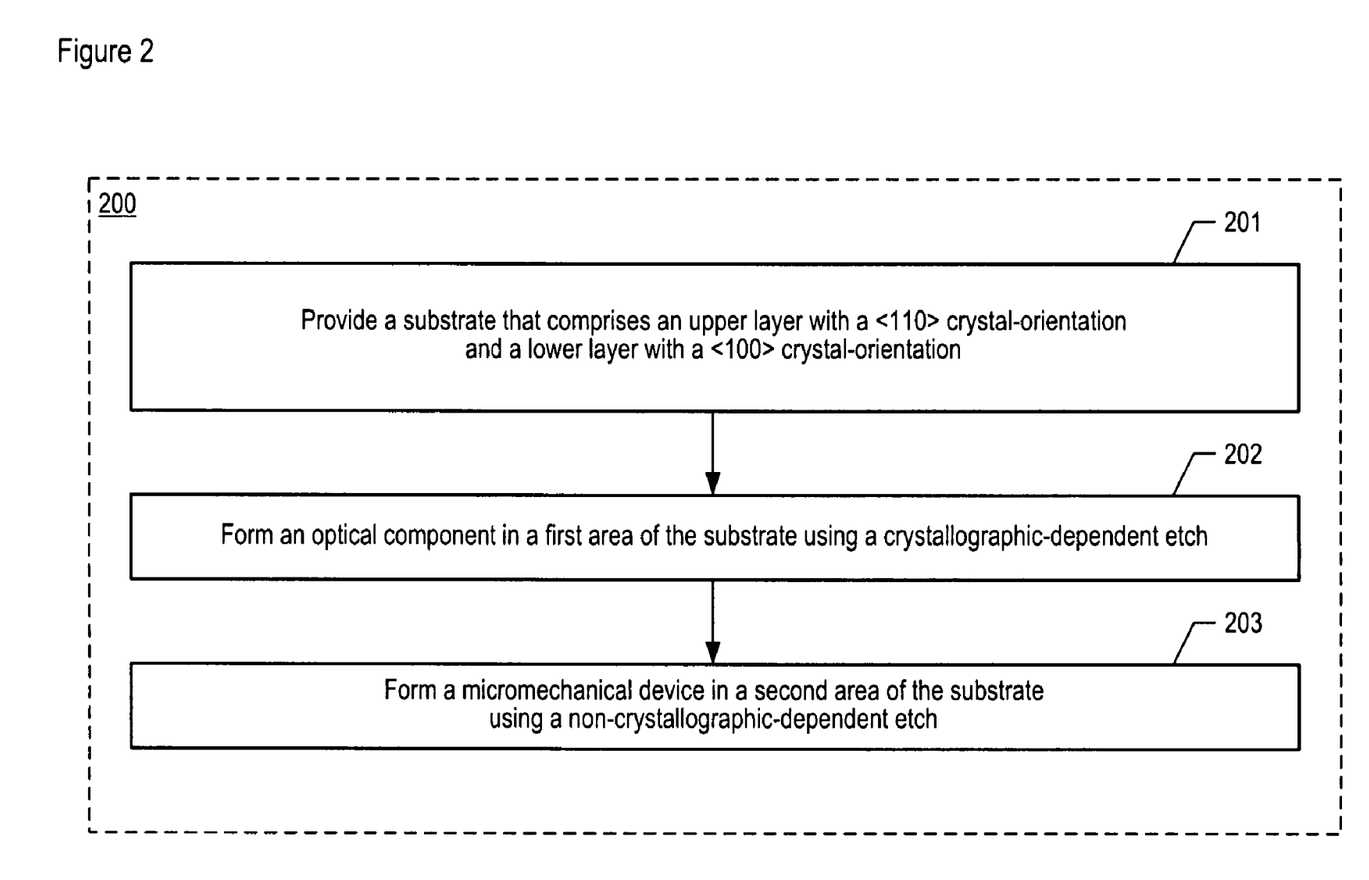
FIG. 2 depicts the salient components of method 200 in accordance with the illustrative embodiment.

FIG. 2 depicts the salient components of method 200 in accordance with the illustrative embodiment. In some embodiments, method 200 is used to form miniature optical system 100 shown in FIG. 1.

At operation 201, a substrate is provided. In the illustrative embodiment, the substrate comprises an upper layer of material having a <110> crystallographic-orientation and a lower layer of material having a non-<110> crystallographic-orientation. Typically, but not necessarily, the non-<110> crystallographic orientation is <100>.

In some embodiments, the substrate further comprises a layer of sacrificial material (i.e., a material that can be removed preferentially relative to both the upper layer and the lower layer) between the upper and lower layers. A typical example of a substrate having these three layers is a "silicon-on-insulator" wafer. This type of wafer will typically have an upper layer of <110> silicon that is 100 μm-thick, a middle layer of an oxide, such as a 2.3 μm-thick layer of silicon dioxide, and a lower layer of <100> silicon that is 500 μm in thickness.

In some other embodiments, the substrate comprises:
a homogeneous wafer of <110> material; or
an upper layer of single-crystal silicon with a crystallographic-orientation that is misaligned by a small angle ($\leq \pm 50$) to the <110> crystallographic-orientation; or
a lower layer that is a <110> silicon wafer.

Operation 202, forming an optical device, and operation 203, forming a micromechanical device, each require multiple sub-operations as a function of the complexity of the optical device and the micromechanical device. Consequently, these operations are best described in the context of a specific device. To that end, optical switch 300, which incorporates both an optical device and a micromechanical device consistent with system 100, is presented in FIG. 3. Optical switch 300 will be used to illustrate operations 202 and 203 of method 200. But before returning to a discussion of method 200, optical switch 300 is described briefly below.

Optical Switch 300

Figure 3:
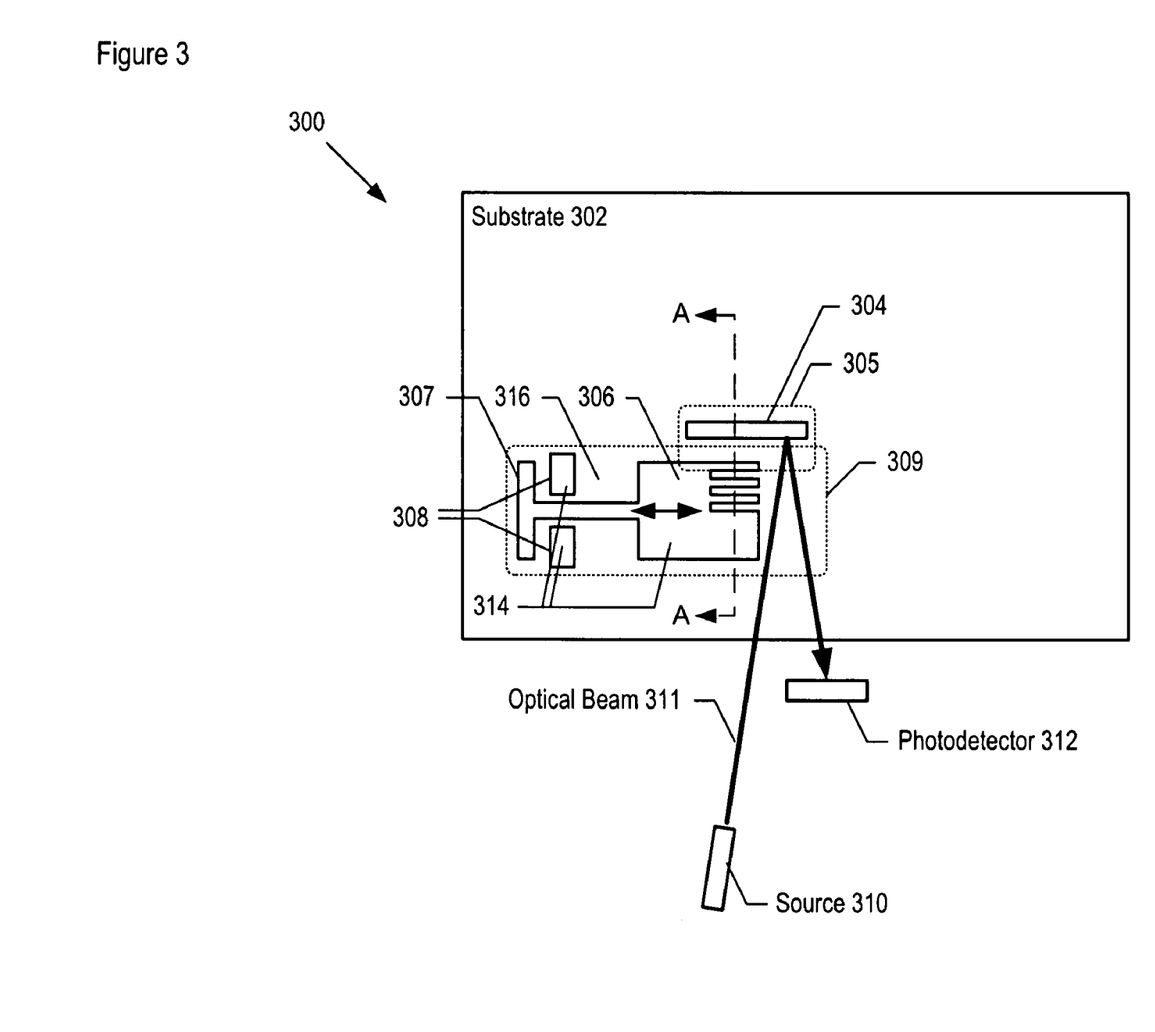
FIG. 3 depicts optical switch 300, which is representative of arrangement 100 depicted in FIG. 1.

Referring now to FIG. 3, optical switch 300 comprises substrate 302, mirror 304 (formed in first area 305), beam blocker 306 (formed in second area 309), electrodes 308, source 310, and photodetector 312. Mirror 304 is representative of optical device 104 of FIG. 1 and beam blocker 306 is representative of micromechanical device 106 of FIG. 1. Mirror 304, beam blocker 306, and electrodes 308 are monolithically-integrated with substrate 302.

Source 310 is an optical source that emits optical beam 311, which is a collimated beam of coherent light (e.g., having a wavelength of 980 nanometers, etc.). Photodetector 312 generates an electrical signal based on the optical energy that is incident on its photodetection region. Source 310 and photodetector 312 are off-substrate devices.

The surface of mirror 304 is a vertically-oriented <111> crystal plane (with respect to the horizontal surface of substrate 302). Mirror 304 receives optical beam 311 and reflects it onto photodetector 312. Optical beam 311 propagates along a path that is parallel to the surface of substrate 302, both before and after incidence on mirror 304. As a consequence, the reflective face of mirror 304 must be orthogonal to the path of optical beam 311. In some embodiments, a reflection layer is deposited on mirror 304 to improve its reflectivity at the wavelength of optical signal 311.

Beam blocker 306 is a two-position micromechanical device. In its non-actuated position, which is depicted in FIG. 3, beam blocker 306 is out of the path of optical beam 311. In this position, optical beam 311 is received by and reflects off of mirror 304, ultimately to be received by photodetector 312. In its actuated position (not depicted), beam blocker 306 is in the path of optical beam 311, such that it prevents the beam from reaching mirror 304. To move beam blocker 306 into the optical path (i.e., to the right in FIG. 3), a voltage is applied across electrodes 308 and portion 307 of the beam blocker. The resulting electrostatic attraction draws portion 307 toward electrodes 308, thereby moving beam blocker 306 to the right, into the path of optical beam 311. Beam blocker 306 includes suspension springs (not shown for clarity), which suspend beam blocker 306 above substrate 302 and also provide lateral compliance that enables beam blocker 306 to move in front of mirror 304 in response to the applied voltage.

As will be described in more detail below and with respect to FIGS. 4, 5, and 6B through 6G (and again with respect to FIGS. 7 and 8A through 8E), first region 314 of second area 309 comprises beam blocker 306 and electrodes 308. Second region 316 of second area 309 comprises the region in which a structural layer of the substrate is removed during the formation of the beam blocker and the electrodes.

Having presented optical switch 300, the description of method 200 continues.

Fabrication of Optical Switch 300—Operation 201

Figure 6A:
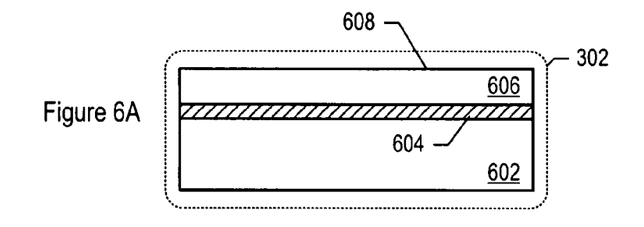
FIG. 6A depicts a substrate for use in fabricating optical switch 300 in conjunction with method 200.

As previously described, operation 201 of method 200 recites providing a substrate. This operation is now described in the specific context of fabricating optical switch 300. FIG. 6A depicts a cross-sectional view of substrate 302. For context, the view is taken along the line A—A in the direction indicated in FIG. 3, recognizing, of course, that the view depicted in FIG. 6A is before optical switch 300 has been formed.

Referring now to FIG. 6A, substrate 302 comprises structural layer 606, sacrificial layer 604, and handle wafer 602. Structural layer 606, which is the upper-most layer of substrate 302, and handle wafer 602 sandwich sacrificial layer 604. Handle wafer 602 is a <100> silicon wafer having a thickness of 500 µm. Sacrificial layer 604 is a film of silicon dioxide that is 10 µm thick and structural layer 606 is a layer of <110> silicon that is 100 µm thick.

Surface 608 of substrate 302 is aligned to the <110> crystallographic direction. For the purposes of this specification, surface 608 is defined as being oriented in the horizontal direction. The <111> crystal planes are therefore oriented in the vertical direction, since the <111> crystal planes in structural layer 606 are orthogonal to the <110> crystal plane. Although surface 608 is aligned to the <110> crystallographic direction in the illustrative embodiment, it will be clear to those skilled in the art, after reading this specification, how to make and use alternative embodiments of the present invention wherein surface 608 is polished at a slight angle to the <110> crystallographic-orientation, and wherein, as a result, the <111> crystal planes in structural layer 606 are at a correspondingly slight angle to vertical.

Fabrication of Optical Switch 300 Operations 202 & 203—First Enabling Method

The way in which operations 202 and 203 are implemented is dictated by the manner in which the mask for patterning the second of the two devices is formed. In other words, the particular sub-operations that compose 202 and 203 are a function of which of the two enabling methods are used to form the mask, as previously described.

In a first enabling method, a mask layer is formed on the surface of the substrate while the surface is still without severe topographical variation. This mask layer is then patterned using conventional photolithography and etching, such that it includes different regions, each of which has a different thickness. The mask can therefore be used to provide protection for the surface of the substrate during multiple etching steps without the need for intervening photolithography. Using this method, the same mask layer can be used during formation of both the optical device and the micromechanical device.

Figure 4:
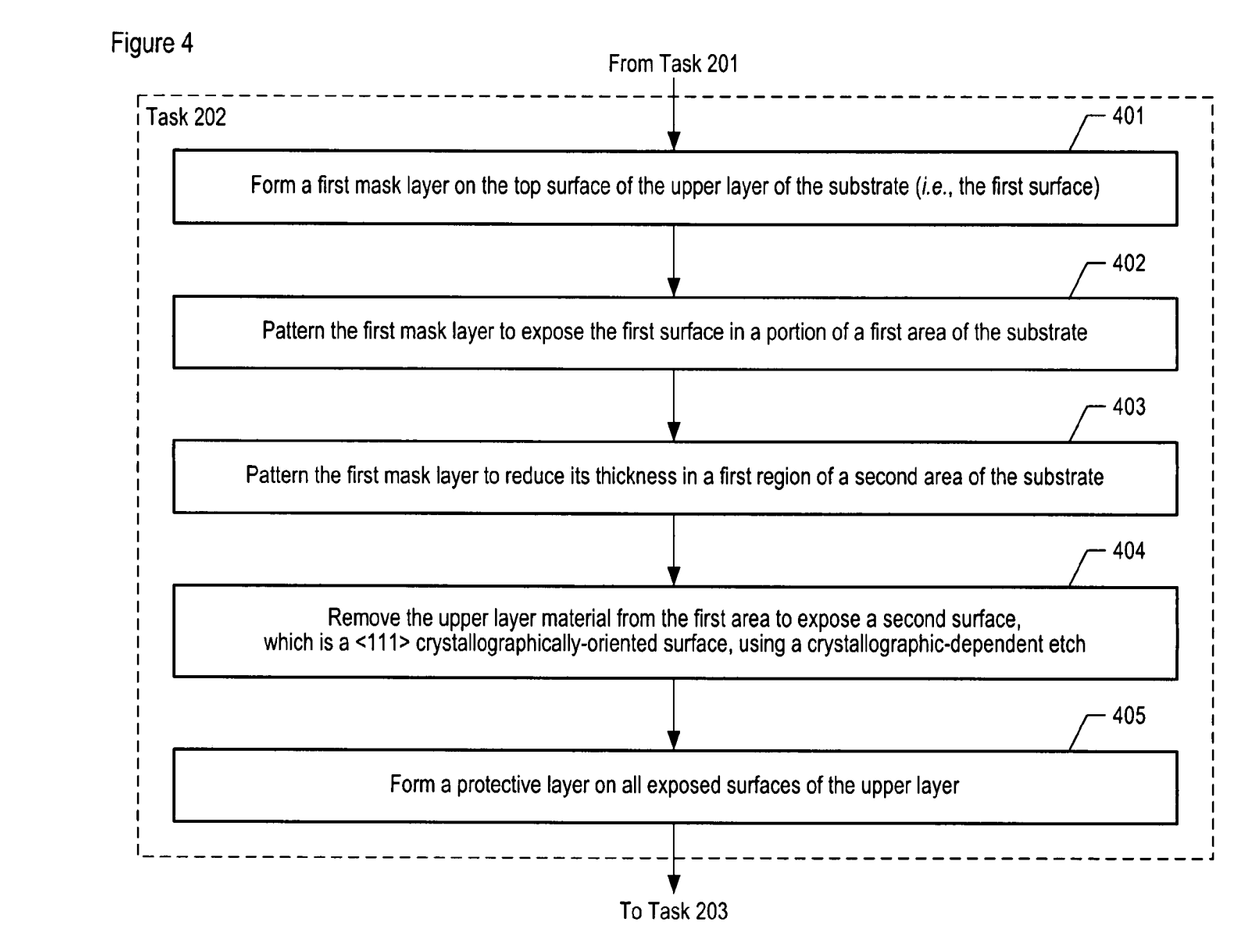
FIG. 4 depicts a flowchart of sub-operations that compose operation 202 of method 200, as implemented using the first enabling method and as applied to the fabrication of optical switch 300.
Figure 5:
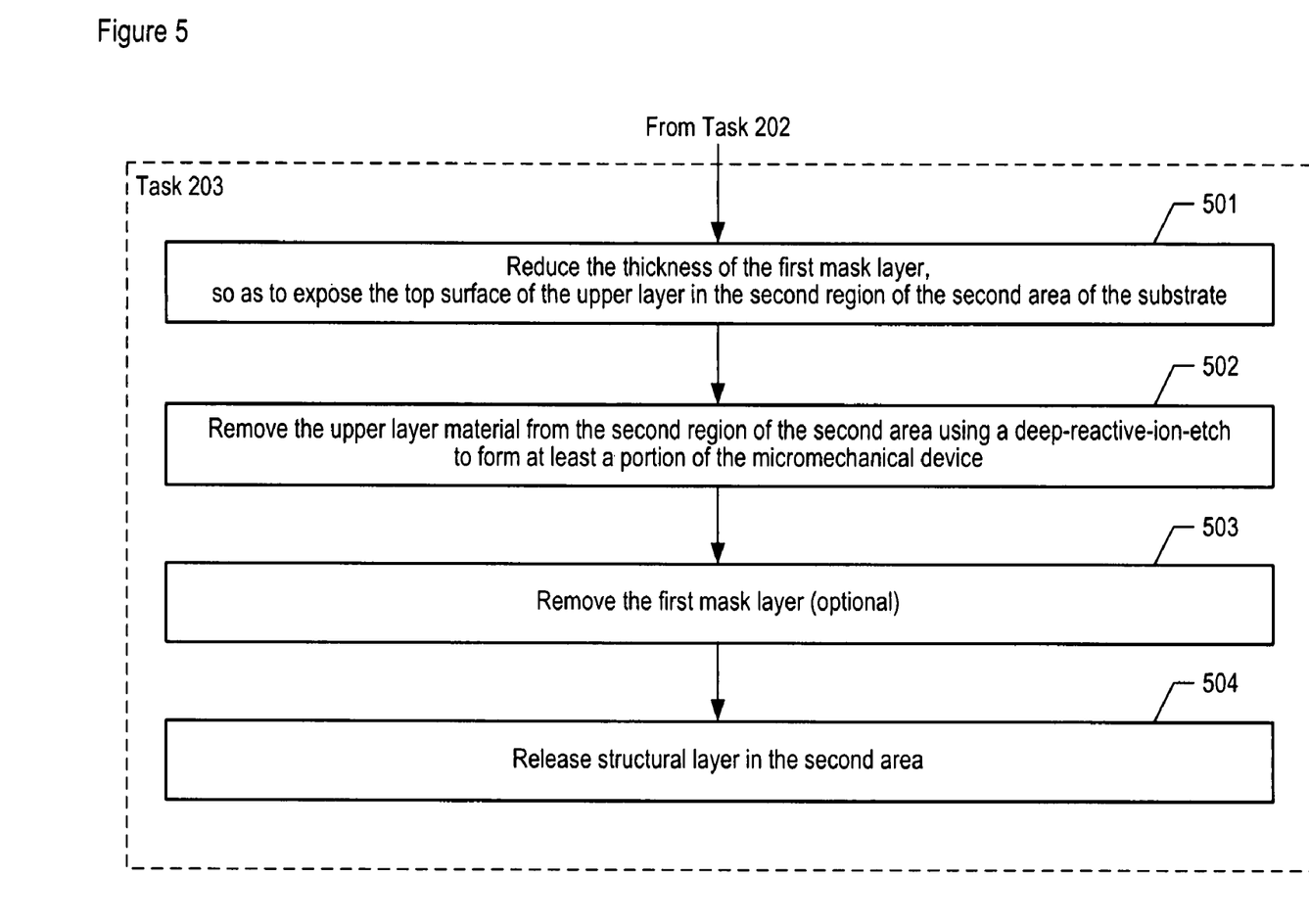
FIG. 5 depicts a flowchart of sub-operations that compose operation 203 of method 200, as implemented using the first enabling method and as applied to the fabrication of optical switch 300.

FIGS. 4 and 5 (flow charts) and FIGS. 6B through 6G (sequential fabrication drawings) depict operations 202 and 203, as applied to fabricating optical switch 300, for embodiments in which the first enabling method is used. FIGS. 6B through 6G depict cross-sectional views of nascent optical switch 300 taken along line A—A, during the fabrication of optical switch 300. It is to be understood that the views are not a cross section of switch 300 depicted in FIG. 3, since the switch, as such, does not exist during fabrication.

Figure 6B:
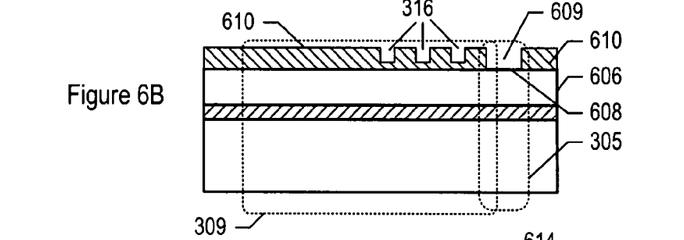
FIGS. 6B through 6G depict sequential "snap shots" of the fabrication of optical switch 300, as fabricated in accordance with the sub-operations depicted in FIGS. 4 and 5.
Figure 6C:
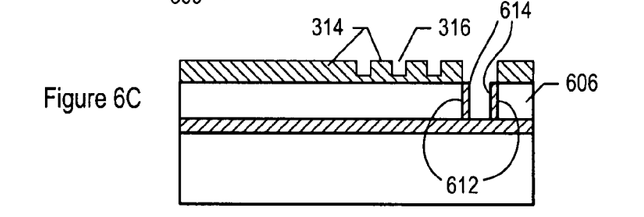

This disclosure now continues with a description of how mirror 304 of optical switch 300 is fabricated using the first enabling method. FIG. 4 depicts sub-operations 401 through 405 for forming mirror 304, and FIGS. 6B and 6C depict sequential fabrication drawings that correspond to the formation of mirror 304.

Sub-operation 401 recites forming a first mask layer on a first surface (i.e., the top surface of the upper layer of the substrate). This mask layer is identified in FIG. 6B as mask layer 610. In the illustrative embodiment, mask layer 610 is a film of silicon-rich silicon nitride having a thickness of 2.5 microns. The film is deposited on surface 608 of substrate 302 using Low-Pressure Chemical Vapor Deposition (LPCVD). In some alternative embodiments, mask layer 610 is a composite layer comprising films of silicon dioxide and silicon nitride. Alternative materials suitable for use as at least a portion of mask layer 610 include, without limitation, stoichiometric silicon nitride, oxides of silicon, nitrides of silicon, silicon carbide, polymers, metals, ceramics, and metal oxides. It will be clear to those skilled in the art, after reading this specification, how to form mask layer 610.

Sub-operation 402 recites patterning the first mask layer to expose the upper layer of the substrate at a specific location (i.e., a portion of a first area of the substrate). FIG. 6B depicts the aftermath of the patterning, which is performed using photolithography and a chemical etch (e.g., RIE, a wet chemical etch, etc.). The patterning results in opening 609 in mask layer 610 in first area 305. The opening exposes surface 608. Opening 609 is aligned to <111> crystal planes in structural layer 606.

Sub-operation 403 recites patterning the first mask layer again, this time to thin it in a certain location (i.e., a second region of a second area of the substrate). FIG. 6B depicts the results of the second patterning of mask layer 610, showing mask layer 610 is thinned at second region 316 of second area 309. Note that mask layer 610 is not thinned in first region 314. Like the first patterning operation, the second patterning is performed using photolithography and a chemical etch.

Sub-operation 404 recites removing the upper layer of material from the first area to expose a second surface using a crystallographic-dependent etch. This second surface is a <111> crystallographically-oriented surface. In order to expose the second surface, an etchant which etches non-<111> crystal planes faster than <111> crystal planes is used. Crystallographic-dependent etchants that are suitable for exposing <111> planes of silicon include potassium hydroxide (KOH), ethylenediamene-pyrocatechol, hydrazine, choline, sodium hydroxide, ammonium hydroxide, cesium hydroxide, or tetramethyl ammonium hydroxide. FIG. 6C depicts the results of sub-operation 404, wherein <111>-oriented surfaces 612 are formed by etching through structural layer 606 in first area 305.

FIG. 6C depicts the significant variation in the topography of surface 608 that results after completing sub-operation 404. As previously described, this type of extreme variation makes subsequent conventional photolithography exceedingly difficult.

Finally, sub-operation 405 of operation 202 recites forming a protective layer on all exposed surfaces of the upper layer of the substrate. FIG. 6C depicts exposed surfaces 612 of structural layer 606 covered with protective layer 614. In the illustrative embodiment, protective layer 614 is a thermally-grown silicon dioxide film, which is 0.2 µm thick. The silicon dioxide film is grown using conventional wet-oxidation techniques, as is well-known to those skilled in the art. Other materials suitable for protective layer 614 include, without limitation, an oxide of silicon, a nitride of silicon, or an oxide or nitride of other semiconductor materials. Other suitable means of providing protective layer 614 include, without limitation, dry-oxidation, LPCVD deposition, plasma-enhanced CVD, and evaporation. It will be clear to those skilled in the art, after reading this specification, how to deposit and use protective layer 614.

Mirror 304, which is the "optical device" of optical switch 300, is fully-formed at the conclusion of sub-operation 405. It is understood, however, that the mirror (one of the surfaces 612) is covered by protective layer 614, which will eventually be removed.

In some alternative embodiments, the operations described above for forming mirror 304 are modified by the addition of a deep RIE etch to do a preliminary "rough-cut" of the mirror. This additional etch avoids the formation of sidewalls characterized by non-vertical <111> crystal planes. The deep RIE etch is followed by a crystallographic-dependent etch, which will then result in only vertical side-walls. In some embodiments, the deep RIE etch is performed between sub-operations 403 and 404.

The description of method 200 continues with reference to FIGS. 5 and 6D through 6G, which depict operation 203—the formation of beam blocker 306—the "micromechanical device" of optical switch 300.

Figure 6D:
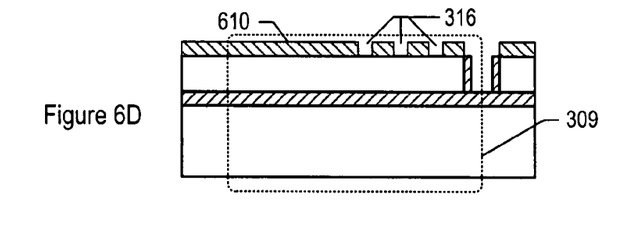

Sub-operation 501 of operation 203 recites reducing the thickness of the first mask layer to expose the top surface of the upper layer of the substrate at a specific location (i.e., in the second region of the second area of the substrate). FIG. 6D depicts substrate 302 after mask layer 610 has been thinned, via an etch process consistent with sub-operation 501. At the conclusion of sub-operation 501, mask layer 610: 1) is removed completely from second region 316 and 2) remains sufficiently thick so as to provide an effective protective layer during subsequent processes. Sub-operation 501 thereby exposes surface 608 in second region 316, yet enables mask layer 610 to protect surface 608 in first region 314. It will be understood that the method can be used to form mask layer 610 having more than two regions of different thickness. It will be clear to those skilled in the art, after reading this specification, how to make and use alternative embodiments of the present invention that comprise any number of regions of different thickness of mask layer 610 to enable the use of mask layer 610 for any number of subsequent processes.

Figure 6E:
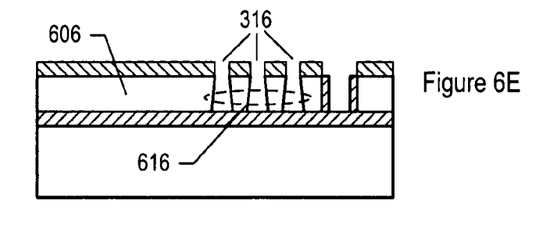

Sub-operation 502 recites removing the upper layer of the substrate from the second region of the second area using deep RIE to form at least a portion of the micromechanical device. FIG. 6E depicts substrate 302 after structural layer 606 has been removed in second region 316. The removal of the structural layer in region 316 exposes a set of third surfaces 616, which do not have a defined crystallographic-orientation. It will clear to those skilled in the art how to remove structural layer material in second region 316.

Figure 6F:
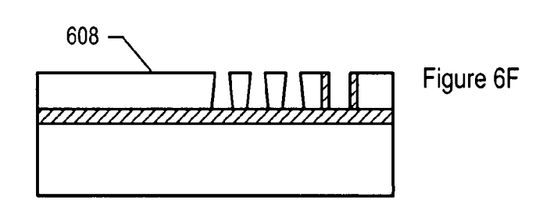

Optional sub-operation 503 recites removing the first mask layer. FIG. 6F depicts substrate 302 after this optional sub-operation, wherein mask layer 610 is removed from surface 608 of substrate 302. It will be clear to those skilled in the art how to remove mask layer 610.

Figure 6G:
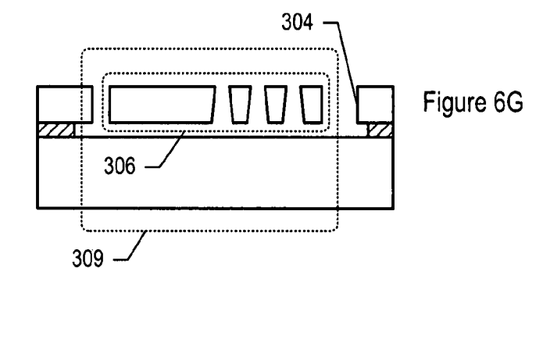

Sub-operation 504 recites releasing, in well-known fashion, the upper layer of the substrate in the second area. This sub-operation frees structural material that is intended to be movable in the finished micromechanical device. FIG. 6G depicts substrate 302 after the structural material that remains in second area 309 is released. This released material forms a part of beam blocker 306.

At this point in the fabrication, a contact pad and wire bond (not depicted), which provide electrical contact to beam blocker 306, are formed on surface 608.

In some alternative embodiments of the present invention, second area 309 comprises a micromechanical device that is not movable or otherwise mechanically-active after substrate 302 is subjected to a release step. These mechanically-inactive devices are formed, for example, for the purpose of providing a fixed location for a discrete component such as a lens, an optical fiber, or a semiconductor device. In still some other alternative embodiments of the present invention, second area 309 comprises mechanical structures for the purpose of conveying a fluid such as a liquid or gas.

Fabrication of Optical Switch 300 Operations 202 & 203—Second Enabling Method As was previously noted, this specification describes two enabling methods by which both crystallographic-dependent etching and deep RIE can be used to create a miniature optical system without the compromises of the prior art. The first method, described above, forms a multi-layer mask while the surface of substrate 102 is without severe topography. The second method employs a second substrate, after the first device is formed, to provide a relatively planar surface, as is suitable for conventional photolithography.

Figure 7:
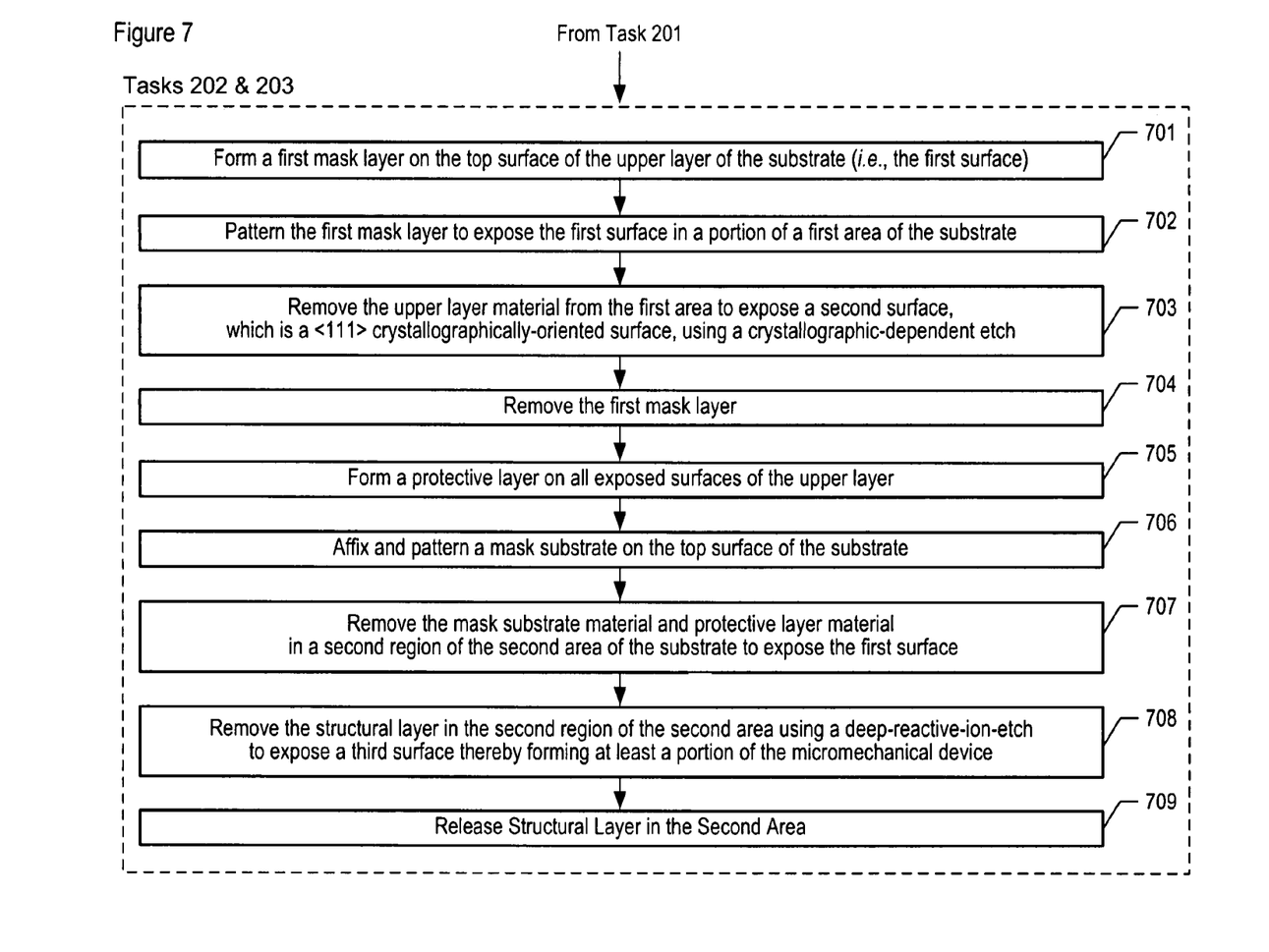
FIG. 7 depicts a flowchart of sub-operations that compose tasks 202 and 203 of method 200, as implemented using the second enabling method and as applied to the fabrication of optical switch 300.

FIG. 7 (flow chart) and FIGS. 8A through 8E (sequential fabrication drawings) depict operations 202 and 203, as applied to fabricating optical switch 300, for embodiments in which the second enabling method is used. Like the previous fabrication drawings, FIGS. 8A through 8E depict cross-sectional views of nascent optical switch 300 taken along line A—A, during the fabrication of optical switch 300. It is to be understood that the views are not a cross section of switch 300 depicted in FIG. 3, since the switch, as such, does not exist during fabrication.

Figure 8A:
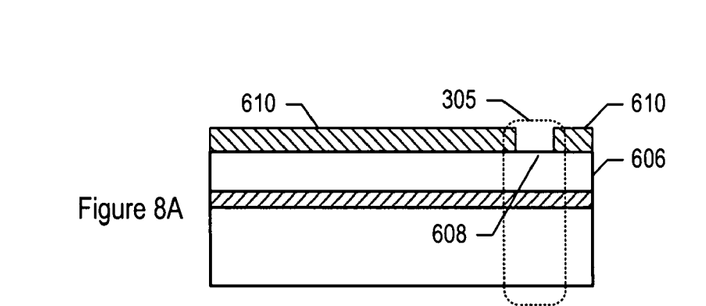
FIGS. 8A through 8E depict sequential "snap shots" of the fabrication of optical switch 300, as fabricated in accordance with the sub-operations depicted in FIG. 7.
Figure 8B:
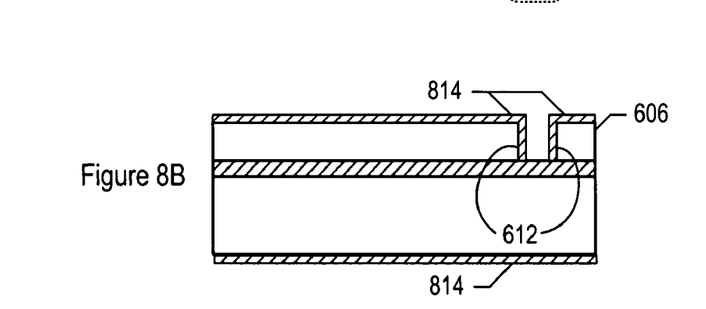
Figure 8C:
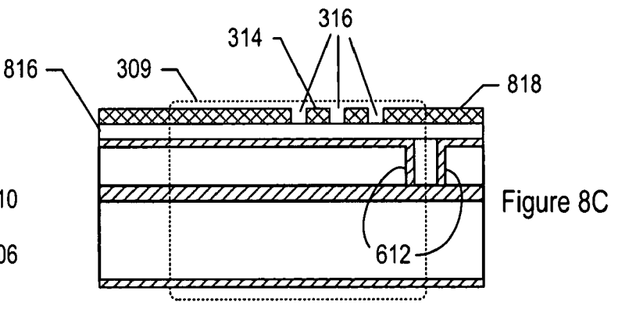
Figure 8D:
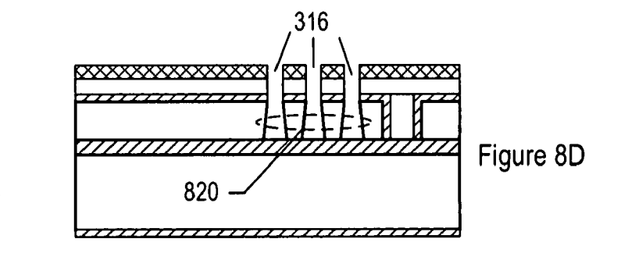
Figure 8E:
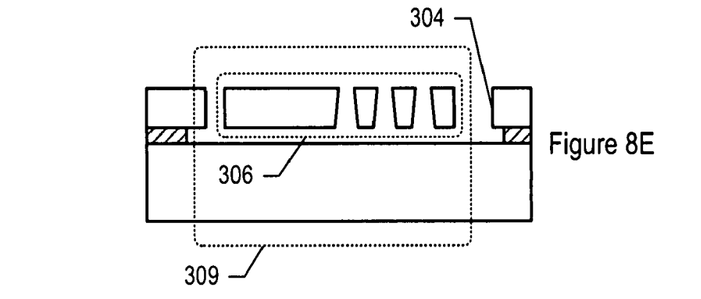

This disclosure now continues with a description of how mirror 304 of optical switch 300 is fabricated using the second enabling method. FIG. 7 depicts sub-operations 701 through 709. Sub-operations 701 through 705 are used for forming mirror 304, and FIGS. 8A and 8B depict sequential fabrication drawings that correspond to the formation of the optical device. Sub-operations 706 through 709 are used for forming micromechanical device 306, and FIGS. 8C through 8E are the corresponding sequential fabrication drawings.

Sub-operation 701 recites forming a first mask layer on the top surface of the upper layer of the substrate. This mask layer is identified in FIG. 8A as mask layer 610. In the illustrative embodiment, mask layer 610 is a film of silicon nitride having a thickness of 250 nanometers (nm). The film is deposited on surface 608 of substrate 302 using Low-Pressure Chemical Vapor Deposition (LPCVD). In some alternative embodiments, mask layer 610 is a composite layer of silicon dioxide and silicon nitride. It will be clear to those skilled in the art how to form mask layer 610.

At sub-operation 702, first mask layer 610 is patterned to expose surface 608 in first area 305. FIG. 8A depicts first mask layer 610 after it is patterned consistent with sub-operation 702.

Sub-operation 703, recites removing the upper layer of material from the first area to expose a second surface using a crystallographic-dependent etch. This second surface is a <111> crystallographically-oriented surface. In order to expose the second surface, an etchant which etches non-<111> crystal planes faster than <111> crystal planes is used. Sub-operation 703 is performed in similar fashion to sub-operation 404 described above and with respect to FIG. 4. FIG. 8B depicts the results of sub-operation 703, wherein <111>-oriented surfaces 612 are formed.

Sub-operation 704 recites removing the first mask layer and sub-operation 705 recites forming a protective layer on all exposed surfaces of the upper layer of the substrate. Sub-operation 705 is performed in similar fashion to sub-operation 405 described above and with respect to FIG. 4.

FIG. 8B depicts substrate 302 after sub-operations 703 through 705 are completed. Second surfaces 612, which are <111> crystal planes of structural layer 606, are exposed through the use of a crystallographic-dependent etch. Furthermore, first mask layer 610 has been removed and protective layer 814 is disposed on all exposed surfaces of substrate 302. In the illustrative embodiment, protective layer 814 is a thermally-grown silicon dioxide film, which is 0.2 µm thick. The silicon dioxide film is grown using conventional wet-oxidation techniques, as is well-known to those skilled in the art. In addition to protecting second surfaces 612 during subsequent processing of substrate 302, protective layer 814 is used to bond mask substrate 816, as is described below and with respect to FIG. 8C. Other materials suitable for use as protective layer 814 include, without limitation, oxides of silicon, nitrides of silicon, oxides of other semiconductors, and nitrides of other semiconductors. It will be clear to those skilled in the art how to form protective layer 814.

In some alternative embodiments, the method described above for forming mirror 304 is modified by the addition of a deep RIE etch to do a preliminary "rough-cut" of the mirror. This additional etch avoids the formation of side-walls characterized by non-vertical <111> crystal planes. The deep RIE etch is followed by a crystallographic-dependent etch, which will then result in only vertical side-walls. The deep RIE etch would be performed between sub-operations 702 and 703.

At this point in method 200, mirror 304 has been formed and surface 608 is no longer amenable to conventional photolithography techniques due to its topography. It would be difficult, therefore, to perform additional operations on substrate 302, as required to form micromechanical device 306. By providing a substantially planar top surface on which conventional photolithography is possible, however, subsequent processing of substrate 302 is enabled.

This planar top surface is provided, in accordance with the second enabling method, by affixing a substantially-planar mask substrate to the top surface of the substrate that has undergone the various fabrication operations. Sub-operation 706 recites this sub-operation, as well as reciting that the mask substrate is patterned.

Patterned mask substrate 816 is depicted affixed to protective layer 814 in FIG. 8C. In this Figure, mask substrate 816 has been thinned in well-known fashion, such as to a thickness of 10 µm. The mask substrate is affixed using any of several methods including, without limitation, fusion bonding, thermo-anodic bonding, gluing, thermal bonding, Van der Waals bonding, and waxing. In some alternative embodiments of the present invention, mask substrate 816 is formed by bonding a wafer having the desired thickness to substrate 302. It will be clear to those skilled in the art how to affix mask substrate 816 to the top surface of substrate 302. Furthermore, in some embodiments, mask substrate 816 is affixed directly to the top surface of substrate 302; no protective layer (e.g., protective layer 814) is present. In yet further embodiments, prior to being bonded to substrate 302, mask substrate 816 is provided with a silicon dioxide layer on all surfaces. By doing so, the thickness of protective layer 814 on second surfaces 612 can differ from the thickness of protective layer 814 on surface 608.

Also depicted in FIG. 8C is second mask layer 818, a layer of photoresist, which is disposed on mask substrate 816. As depicted in FIG. 8C, second mask layer 818 has been patterned to correspond to second region 316, as recited in sub-operation 706. The patterning is performed using photolithography and a chemical etch (e.g., RIE, a wet chemical etch, etc.). Second mask layer 818 is suitably thick for protecting mask substrate 816 in first region 314 during the following sub-operation. In some alternative embodiments, second mask layer 818 comprises a material other than photoresist. Other materials suitable for use in second mask layer include, without limitation, silicon dioxide, silicon nitride, and metals.

Once second mask layer 818 has been patterned, its pattern is transferred into mask substrate 816 and protective layer 814 via an etch process. This occurs in sub-operation 707, which recites removing the mask substrate material and protective layer 814 in second region 316. In sub-operation 708, patterned protective layer 814 enables the transfer of its pattern into structural layer 606 using deep RIE. The removal of structural layer 606 in second region 316 exposes third surfaces 820. This is depicted in FIG. 8D. At this point, mask substrate 816 can be removed from substrate 302. In some alternative embodiments, the thickness of second mask layer 818 is made thinner than the thickness of protective layer 814 on surface 608. As a result, second mask layer 818 and mask substrate 816 are removed during the deep RIE step that patterns structural layer 606. In some other alternative embodiments, a portion of mask substrate 816 may be protected such that it remains and can be used as structural, mask, or sacrificial material during subsequent processing steps.

Sub-operations 706 through 708 can be repeated as many times as necessary to achieve the desired configuration of structural layer 606. In addition, the two enabling methods described herein are compatible and can, therefore, be performed in combination and in arbitrary order on the same substrate.

Sub-operation 709 recites releasing, in well-known fashion, the upper layer of the substrate in the second area. This sub-operation frees structural material that is intended to be movable in the finished micromechanical device. FIG. 8E depicts substrate 302 after the structural material that remains in second area 309 is released. This released material forms a part of beam blocker 306.

At this point in the fabrication, a contact pad and wire bond (not depicted), which provide electrical contact to beam blocker 306, are formed on surface 608.

In some alternative embodiments of the present invention, second area 309 comprises a micromechanical device that is not movable or otherwise mechanically-active after substrate 302 is subjected to a release step. These mechanically-inactive devices are formed, for example, for the purpose of providing a fixed location for a discrete component such as a lens, an optical fiber, or a semiconductor device. In still some other alternative embodiments of the present invention, second area 309 comprises mechanical structures for the purpose of conveying a fluid such as a liquid or gas.

The two versions of operations 202 and 203 described herein result in the formation of optical device 104 and micromechanical device 106 in structural layer 606. In some alternative embodiments of the present invention, at least one of optical device 104 and micromechanical device 106 is formed in material disposed on structural layer 606. In some other alternative embodiments of the present invention, at least one of optical device 104 and micromechanical device 106 is formed in handle wafer 602. In still other alternative embodiments of the present invention, at least one of optical device 104 and micromechanical device 106 is formed in material that is disposed on handle wafer 602 between handle wafer 602 and structural layer 606.

It should be noted that the two versions of operations 202 and 203 described herein, although described as being directed toward sculpting structural layers having a <110> crystallographic-orientation, are applicable to sculpting structural layers having any crystallographic orientation. Examples of such other materials that are suitable include, without limitation, <111> silicon, <100> silicon, germanium, alumina, gallium-arsenide, indium-phosphide, silica, silicon dioxide, borosilicate glass, pyrex, sapphire, and <xxx> silicon (where any x can be either 1 or 0) that has a crystallographic orientation that is misaligned by any angle to its conventional crystallographic orientation.

It is to be further understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
   etching a first surface of a substrate to expose a second surface, wherein said first surface is characterized by a non-<111>-crystallographic orientation and wherein said second surface is characterized by a <111>-crystallographic orientation; and
   etching said first surface of said substrate to expose a third surface, wherein said third surface is not characterized by a <111>-crystallographic orientation;
   wherein said first surface and said second surface form an angle that is within a range of 85 degrees to 95 degrees.

2. The method of claim 1 wherein said angle is 90 degrees.

3. The method of claim 1 further comprising forming a mask layer for defining the location of said third surface.

4. The method of claim 1 further comprising forming a protection layer for protecting said second surface during formation of said third surface.

5. The method of claim 1 wherein said first surface of said substrate is characterized by a <110>-crystallographic orientation.

6. The method of claim 1 wherein said substrate comprises a bulk silicon substrate which is characterized by a <110>-crystallographic orientation.

7. The method of claim 1 wherein said substrate comprises a structural layer disposed on a sacrificial layer disposed on a handle wafer, wherein said structural layer is characterized by a <110>-crystallographic orientation.

8. The method of claim 7 further comprising removing at least a portion of said sacrificial layer.

9. The method of claim 7 wherein said structural layer is silicon.

10. The method of claim 1 wherein the operation of etching a first surface to expose a second surface further comprises using a first etchant, wherein said first etchant is characterized by a crystallographic-dependency such that said first etchant etches a non-<111>-crystallographic direction faster than the <111>-crystallographic direction.

11. The method of claim 10 wherein said first etchant comprises a chemical selected from the group consisting of potassium hydroxide, ethylenediamene-pyrocatechol, hydrazine, choline, sodium hydroxide, ammonium hydroxide, cesium hydroxide, and tetramethyl ammonium hydroxide.

12. The method of claim 1 wherein the operation of etching a first surface to expose a third surface further comprises using a second etchant, wherein said second etchant is substantially crystallographic-orientation-independent.

13. A method comprising:
   etching a first surface of a silicon layer in a first etch to form a first sidewall, wherein said first surface has a crystallographic orientation that is aligned to a <110> crystallographic orientation at a first angle that is within the range of approximately −5 degrees to approximately +5 degrees; and etching said first surface in a second etch to form a second sidewall;
   wherein one of said first sidewall and said second sidewall is characterized by a <111>-crystallographic
   orientation, and wherein said first surface and said one of said first sidewall and said second sidewall forms a second angle that is within the range of 85 degrees to 95 degrees, and wherein said first angle is the complement of said second angle, and further wherein the other one of said first sidewall and said second sidewall is characterized by a non-<111>-crystallographic orientation.

14. The method of claim 13 wherein said angle is approximately 0 degrees.

15. The method of claim 13 further comprising forming a mask layer for defining the location of said second sidewall.

16. The method of claim 13 further comprising forming a protection layer for protecting said first sidewall during formation of said second sidewall.

17. The method of claim 13 wherein said silicon layer is disposed on a sacrificial layer, and wherein said method further comprises removing at least a portion of said sacrificial layer.

* * * * *